April 21, 1964  F. B. RIVERS  3,129,952
CHILD'S BABY CRAWLER TYPE VEHICLE
Filed Dec. 7, 1962
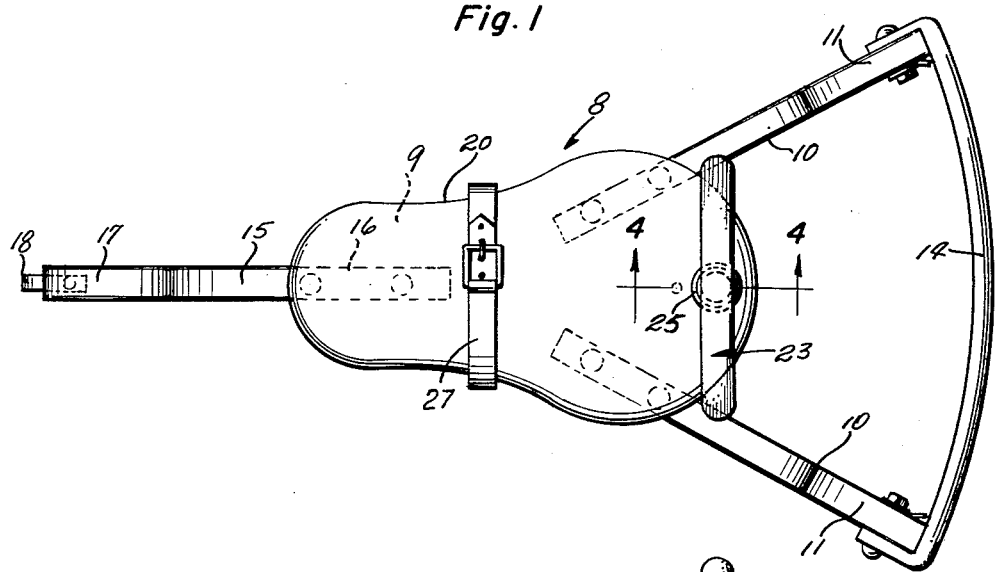
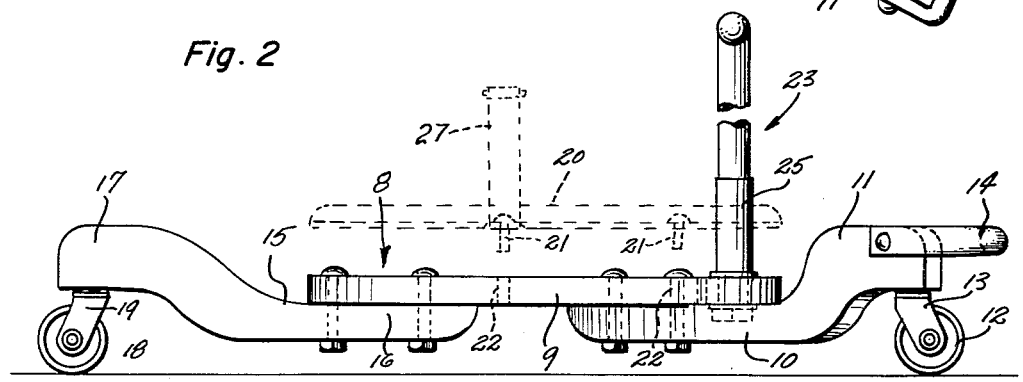
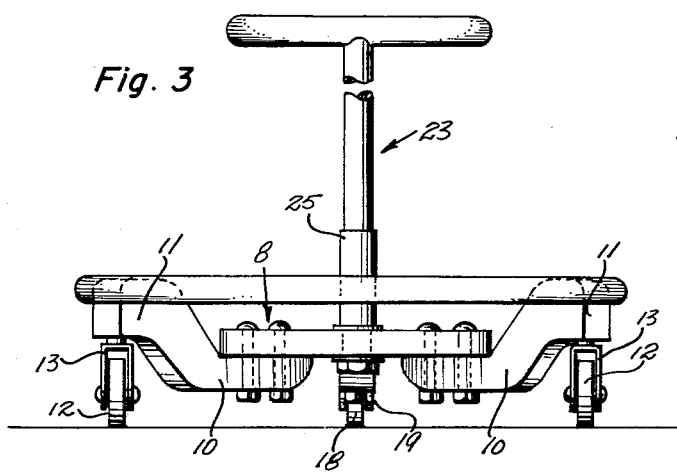
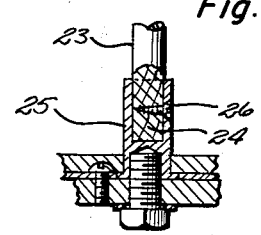
INVENTOR
Frances B. Rivers

United States Patent Office 3,129,952
Patented Apr. 21, 1964

1

3,129,952
CHILD'S BABY CRAWLER TYPE VEHICLE
Frances B. Rivers, 339 Delmar Place, Covington, Ky.
Filed Dec. 7, 1962, Ser. No. 242,956
1 Claim. (Cl. 280—87.02)

This invention relates to vehicles for children, and more particularly to a vehicle on which a young child may lay upon and push himself about.

Parents, and others interested in the welfare of children, have often expressed a desire for a vehicle for the child that could easily be pushed about either in a sitting up position, or by laying down on one's stomach as is most comfortable for very young children, who will thus paddle the vehicle along with their hands and feet.

Unfortunately, manufacturers of children's vehicles and toys have given little if any, productive thought to the above noted desires of people who have the welfare of children at heart, insofar as their mode of transportation about the house or yard is concerned, or about the toys on which they ride.

It is, therefore, the prime object of the present invention to provide a child's vehicle on which a child of any age can safely ride in any desired position.

Another object of this invention is to provide a child's vehicle especially adapted for use by small children or babies, who may prefer to lie on their stomach and propel themselves about with their hands and feet.

Another object of this invention is to provide a child's vehicle having a safety belt to keep a young child from falling off the same.

Another object of this invention is to provide a child's vehicle having its wheels so located that a young child cannot get his hands or feet entangled in the same when lying prone on its padded seat.

Another object of this invention is to provide a child's vehicle having a removable handle that can quickly and safely be put in place when an older child is to ride on the same.

Still another object of this invention is to provide a child's vehicle that can be manufactured from any desired material and in any desired size depending upon the retail price for which the vehicle is to sell.

From the preceding, it is seen that the invention has as its objects, among others, the provision of a child's vehicle of the character described which is of simple and economical construction and which can be employed to meet the requirements indicated above. Other objects of the invention will become apparent from the following description.

Referring to the drawings for a more detailed description,

FIGURE 1 is a top view of this invention.

FIGURE 2 is a side view of this invention with its removable seat and safety belt shown in phantom lines.

FIGURE 3 is a front view of this invention.

FIGURE 4 is a sectional view of one detail of this invention taken substantially along line 4—4 of FIGURE 2 as viewed in the direction indicated by the arrows.

Similar reference characters refer to similar parts throughout the several views of the drawing.

Having reference now to the drawing in detail, there is generally indicated by the character 8, a child's vehicle embodying an oblong platform 9 to the underside, of which is bolted a pair of bars 10, that are the forward roller legs of this novel invention, and which have their forward end 11 raised to permit room between their underside and the ground or floor for the swivel wheels 12 of the casters 13. A curved bumper 14, is secured by each end to the aforesaid bars 10, as is clearly shown

2 in FIGURE 1 of the appended drawing, where it is also seen that a third bar 15 has its front end 16 bolted to the underside and center of the aforesaid platform 9, while its rear end 17 is raised like that of the aforesaid bars 10 for the same purpose, namely, to provide space between the underside of the aforesaid bar 15 and the floor or ground for the reception of the rear swivel wheel 18 of the caster 19. A removable pad 20, the same size as that of the aforesaid oblong platform 9, is secured to the platform by means of a pair of spaced screws 21 extending downward from the aforesaid pad 20 and projecting through openings 22 in the platform to which it, the pad, is secured by a pair of wing nuts, which are not shown in any of the figures in the appended drawing. A removable T-shaped handle 23 is held in a vertical position and at right angle to the aforesaid oblong platform 9, by reason of its lower end 24 being placed in the socket 25, to which it is secured by a screw 26 as is clearly shown in FIGURE 4 of the appended drawing. The aforesaid T-shaped handle 23 can be of any desired length to permit the rider of the vehicle to sit down or stand upon the invention as desired. A safety belt 27 is suitably secured to the aforesaid removable pad 20, which, along with its holding screws 21, is shown in phantom lines in FIGURE 2 of the appended drawing.

A typical use of this novel invention is obtained when a pre-crawling infant is placed face down on the comfortable removable pad 20, which may be of foam rubber, having an easily cleaned plastic cover over the same. The aforesaid safety belt 27 is now fastened around the infant's body. In this position the infant's hands can reach the floor on either side of the vehicle, but by having the legs extended the hands cannot become involved with the two front wheels 12. The infant's head is protected by the curved bumper 14, which also protects furniture from scuffing. The infant's feet extend to the floor on either side of the oblong platform 9, thereby keeping the toes from becoming involved with the back wheel 18 because of its extending beyond reach of the infant. Since this novel vehicle has three wheels, all of which are wide apart from one another, the device will not tip over. The infant lying on its stomach and securely fastened to the pad 20, soon learns to propel itself slowly by pulling with its hands and pushing with its feet against the floor. A piece of chord can be attached to the socket 25 for the pulling of the device to acquaint the infant with motion. The pulling and pushing motion by the infant will provide exercise which will strengthen the arm and leg muscles.

From the foregoing, it will now be seen that there is herein provided a child's vehicle which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

Having described my invention, what I claim as new, and desire to secure by Letters Patent is:

A child's vehicle of the character described, comprising a flat oblong horizontally disposed platform, having a pair of spaced, and angularly, and outwardly disposed bars secured to the front end and underside thereof, each bar having its outer end raised for the reception of a caster swively supporting a wheel and a third bar, having its front end secured to the center, underside, and rear portion of the said oblong platform, the said third bar also having its rearmost end raised for the reception of a caster swively supporting wheel, and an oblong foam rubber pad covered with plastic, the same shape and size as that of the said oblong platform to which it is removably secured by a pair of screws and wing nuts, and a hollow vertically disposed socket centrally located on the front end of the said oblong platform, and a T-shaped handle removably secured in the said socket, the said T-shaped handle being adjustable in height and rising vertically from the said vehicle, and a safety belt secured to the oblong pad, thereby providing a means of keeping an infant from falling off the said vehicle when lying prone on its stomach on the same.

References Cited in the file of this patent

UNITED STATES PATENTS

| | | |
|---|---|---|
| 816,745 | Rowley | Apr. 3, 1906 |
| 1,432,612 | O'Connor | Oct. 17, 1922 |
| 1,550,195 | Zunac et al. | Aug. 18, 1925 |
| 1,572,273 | Elton | Feb. 9, 1926 |
| 1,786,663 | Leek | Dec. 30, 1930 |
| 2,176,832 | Allen | Oct. 17, 1939 |
| 2,220,238 | Hansburg | Nov. 5, 1940 |

FOREIGN PATENTS

| | | |
|---|---|---|
| 246,030 | Great Britain | Jan. 21, 1926 |